F. W. MEYER.

TRUNK SECURING MEANS.

APPLICATION FILED DEC. 15, 1915.

Reissued May 30, 1916. 14,143.

Witnesses:
P. F. Poole
E. S. Peeples.

Inventor:
Frank W. Meyer.
by Poole & Warren Attys

UNITED STATES PATENT OFFICE.

FRANK W. MEYER, OF OSHKOSH, WISCONSIN, ASSIGNOR TO OSHKOSH TRUNK COMPANY OF OSHKOSH, WISCONSIN, A CORPORATION OF WISCONSIN.

TRUNK-SECURING MEANS.

14,143. Specification of Reissued Letters Patent. Reissued May 30, 1916.

Original No. 1,151,370, dated August 24, 1915, Serial No. 873,105. Application for reissue filed December 15, 1915. Serial No. 67,055.

*To all whom it may concern:*

Be it known that I, FRANK W. MEYER, a citizen of the United States, and resident of Oshkosh, in the county of Winnebago and State of Wisconsin, have invented new and useful Improvements in Trunk-Securing Means, of which the following is a description, reference being had to the accompanying drawings, which are a part of this specification.

This invention has for its object to provide a trunk securing means which will lock the trunk at several points in one locking operation making it unnecessary to provide separate locks at the different points at which the locking is to be effected.

Another object of the invention is to provide such a multiple locking means under single control particularly adapted for use with wardrobe trunks or other large trunks intended to stand on end and open along a vertical plane, though the invention is not confined to such particular use but is capable of use generally with various forms of trunks and the like.

With the above and other objects in view the invention consists in the trunk securing means as herein claimed and all equivalents.

Figure 1:
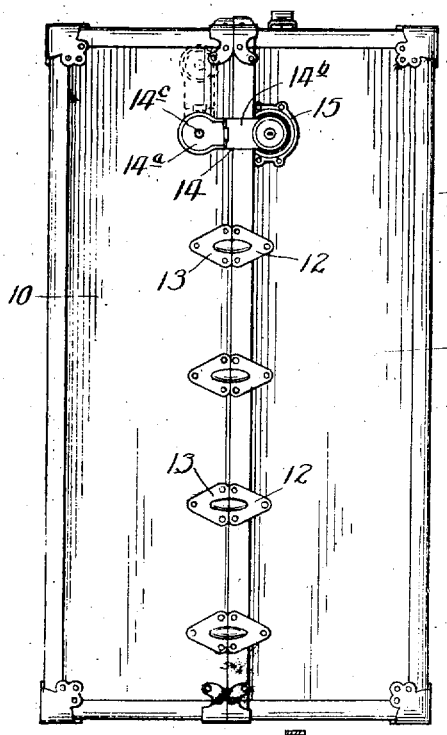
Figure 2:
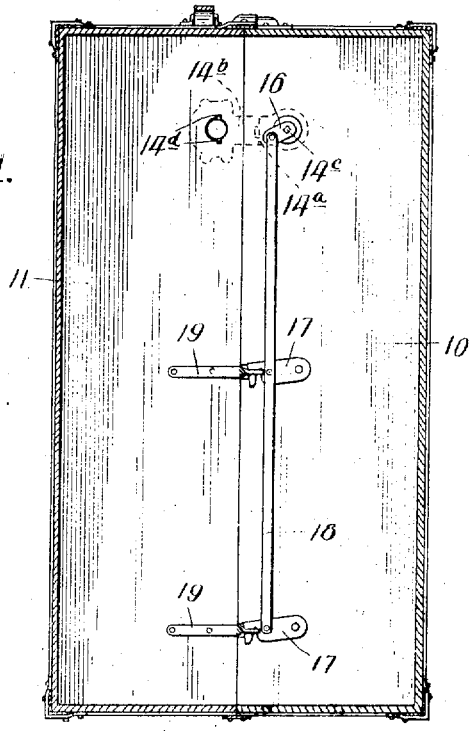
Figure 3:
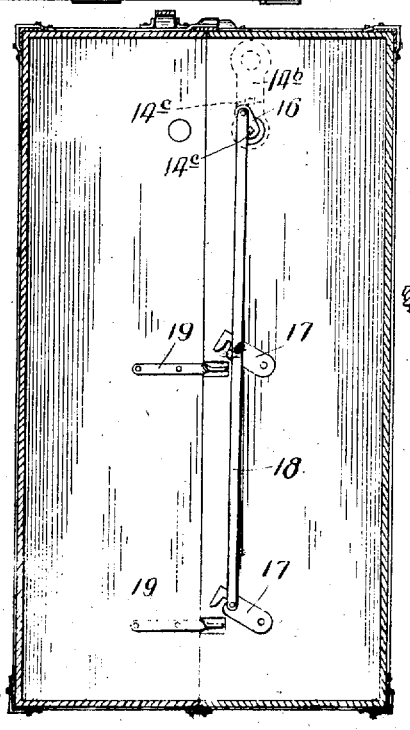
Figure 4:
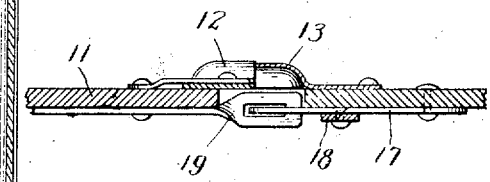

Referring to the accompanying drawings in which like characters of reference indicate the same parts in different views: Figure 1 is a front elevation of a trunk provided with a trunk securing means constructed in accordance with this invention, the trunk lock being shown in dotted lines in its released position; Fig. 2 is a sectional view thereof showing the trunk securing means of this invention as it appears within the trunk when in its locked position; Fig. 3 is a similar view thereof with the trunk securing means in its released position; and Fig. 4 is a detail view of one of the pivotally mounted hook members and its engaged eye strap.

In these drawings 10 indicates one trunk member and 11 the other trunk member, the two being hinged together as usual and being provided along their front edges and their top and bottom edges with interfitting dowels 12 and their sockets 13 as usual to strengthen the joint of the trunk members against disengagement. A hinged locking member 14 is pivotally mounted on the trunk member 10 and has a locking engagement with a socket 15 on the trunk member 11, such engagement being controlled by a key as usual though the latter is not shown. The locking member 14 passes through the wall of the trunk member 10 and in the inside thereof is provided with a crank arm 16. One or more hook members 17 are pivotally mounted within the trunk member 10 at points distant from the locking member 15 and are connected together and to the crank arm 16 by means of a connecting rod or link 18 so that as the locking member is swung from one position to another the hook members are also swung into and out of engagement with loops or eyes formed in the end of eye straps 19 secured to the inside of the edge of the other trunk member. Preferably though not necessarily the eye straps 19 are twisted as shown in Fig. 4 and have their projecting ends fitting within notches formed in the edge of the trunk member 10 and these engaging parts are positioned behind a pair of the interfitting dowels and sockets 12 and 13.

In operation the trunk securing means of this invention is controlled by the pivotal movement of the locking member 14 so that as the locking member is swung from its vertical position shown in dotted lines in Figs. 1 and 3 to its horizontal position for engaging the socket 15 as shown in Fig. 1 not only is said locking member itself brought into a position for securing the trunk members together, but by reason of the simultaneous movement given to the hook members 17 through their connection with the crank arm 16 of the locking member they are engaged with the eyes 19 to firmly secure the edges of the trunk members together at points distant from the locking member and when said locking member is locked the hook members are secured against disengagement and constitute supplemental locks which remain engaged until the lock member is unlocked with the key and is swung to its vertical position thereby lifting the hook members and disengaging the trunk securing means at all points.

As shown in the drawings, the locking member 14 comprises two parts $14^a$ $14^b$, the latter having hinged connection with the former. The part $14^a$ is rigidly secured to the outer end of a pivot or like pin $14^c$, which extends transversely through the front wall of the trunk section 10 and is rotatably mounted therein. The crank arm 16 is secured to the inner end of said pivot pin $14^c$. The hinged part $14^b$ is provided with the trunk lock having locking bolts $14^d$, $14^d$, which, when the hinged part $14^b$ occupies the position shown in full lines in Fig. 1 and in dotted lines in Fig. 2, engage within the receiving socket 15 and serve to lock the locking member 14 in its closed position. To unlock the trunk, the locking bolts $14^d$, $14^d$ are withdrawn by a key or the like, and the hinged part $14^b$ is swung out of the socket 15 and occupies a position extending outward from the trunk. In this position of the parts the trunk lock is unlocked, but the hook members 17, 17 still engage the eye straps 19, 19 and secure the trunk sections 10, 11 together. At this time the part $14^a$ of the lock casing remains in the position shown in full lines in said Fig. 1 and in dotted lines in Fig. 2. To move the hooks 17, 17 out of locking engagement with said eye straps, the outwardly extending hinged part $14^b$ is grasped and turned bodily into the position shown in dotted lines in Figs. 1 and 3, and during such movement the part $14^a$ is also turned bodily into the position shown in dotted lines in said figures. In this movement of the lock casing 14, the link 18 is moved endwise upward and the hooks 17, 17 withdrawn from their engagement with the eye straps 19, 19. The trunk sections 10, 11 are now unlocked and may be swung apart to open the trunk. To lock the trunk the trunk sections are closed together, and the hinged part $14^b$ of the lock casing grasped and turned bodily downward, thereby rotating the pivot pin $14^c$ and moving the hooks 17, 17 into locking engagement with the eye straps 19, 19. The hinged part $14^b$ now extends outward from the trunk, as before, but in a position to be swung into locking engagement with the socket 15. It will be noted that the trunk sections 10, 11 are locked together before the trunk lock 14 is locked. By reason of the fact that the part $14^b$ of the lock casing 14 is hinged to the other part $14^a$ of said casing, the parts may be arranged to be moved in a plane parallel to the front walls of the trunk sections and thereby occupy positions along the outside of the trunk and in no manner interfere with the free use of the trunk.

The trunk securing means of this invention is strong and durable and is quickly operated for either locking or unlocking the trunk.

What I claim as new and desire to secure by Letters Patent is:

1. The combination with a trunk having two sections hinged together, of locking-means therefor comprising a lock-casing rotatably mounted on one of said sections, a plurality of fixed locking-members on the other of said sections, an endwise movable bar, a plurality of locking-hooks on said bar, said locking-hooks being moved with said bar into and out of engagement with said fixed locking-members, and means connecting said bar with said lock-casing to impart to said bar positive endwise movement in either direction when said lock-casing is turned int an out of its locking position.

2. The combination with a trunk having two sections hinged together, of locking-means therefor comprising a fixed locking-member on one of said sections, a locking-member pivotally mounted on the other section, an endwise movable bar pivotally connected intermediate its ends with said pivoted locking-member and adapted to move the latter into and out of engagement with said fixed locking-member, a lock-casing movably mounted on said last-named section, and means interposed between one end of said bar and said lock-casing whereby said bar will be moved endwise to cause said locking-members to engage when said lock-casing is moved into its locking position.

3. The combination with a trunk having two hinged together sections, of means for locking said sections together when the trunk is closed, comprising a lock casing rotatably mounted on one of said trunk sections, a locking member pivotally mounted on said trunk section, a locking member fixed on the other of said trunk sections, an endwise movable bar pivotally connected with said pivoted locking member and adapted to move the latter into and out of locking engagement with said fixed locking member, and a member connecting said lock casing with said bar, whereby the latter will be given positive endwise movement in both directions by said lock casing, when the latter is moved into and out of its locking position.

4. Means for securing together two members of a trunk, comprising a locking member pivotally mounted on one trunk member, a socket on the other trunk member engaged by the locking member, a crank arm on the locking member inside of the trunk, hook members pivotally mounted within the trunk member on which the locking member is pivotally mounted, eye straps secured to the other trunk member and engaged by the hook members and a link connecting the hook members with the crank of the locking member for causing the hook members to engage the eye straps when the locking member is swung to the position for engaging the socket.

In testimony whereof, I affix my signature, in presence of two witnesses.

FRANK W. MEYER.

Witnesses:
A. E. KASTEN,
JENNIE KUSH.